INVENTOR
Raymond C. Fischer
Paul O. Pippel
ATTORNEY

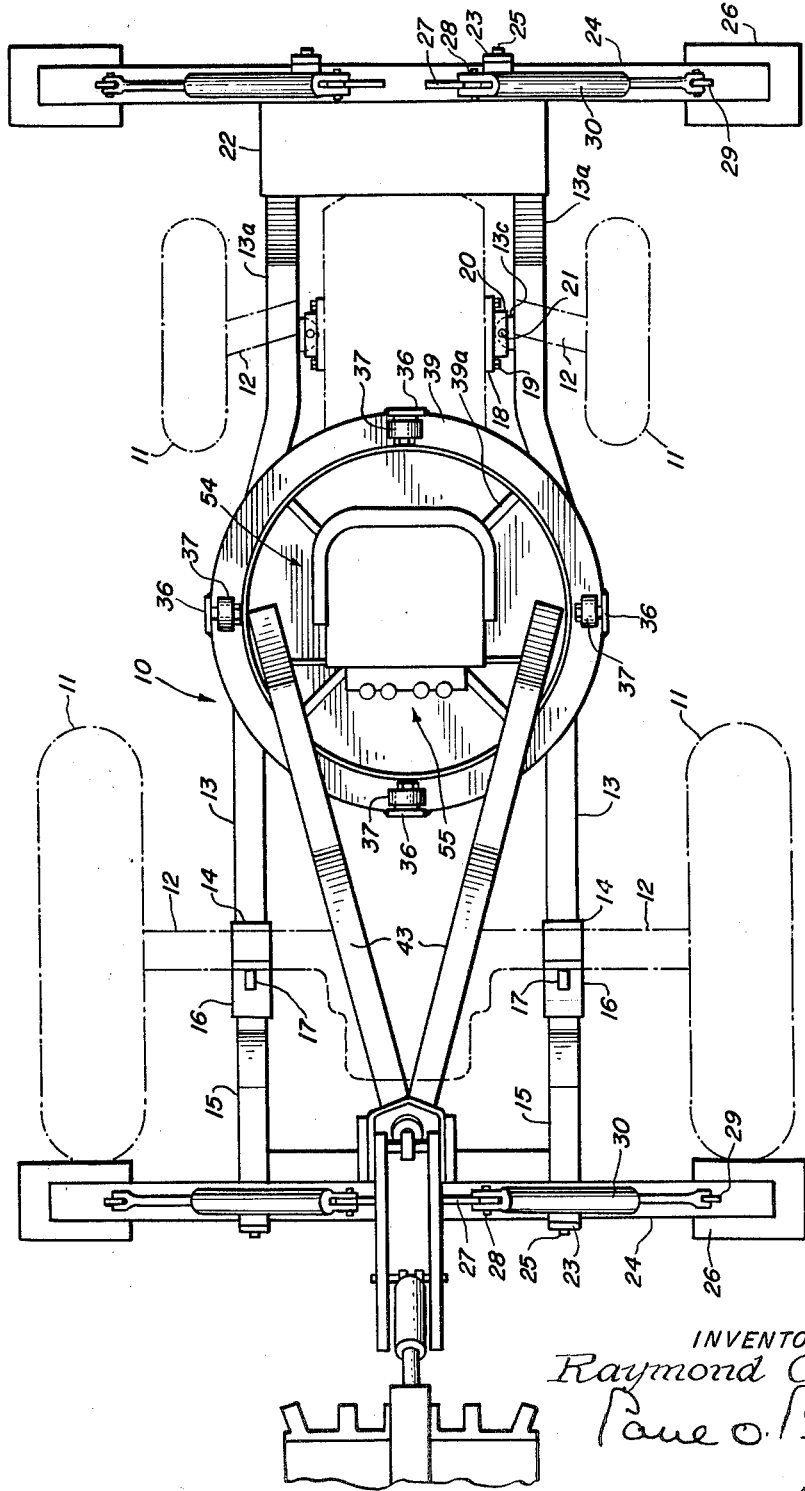

June 22, 1965 R. C. FISCHER 3,190,475
TRACTOR SUPPORTED IMPLEMENT MOUNTING
Filed Oct. 2, 1961 3 Sheets-Sheet 3
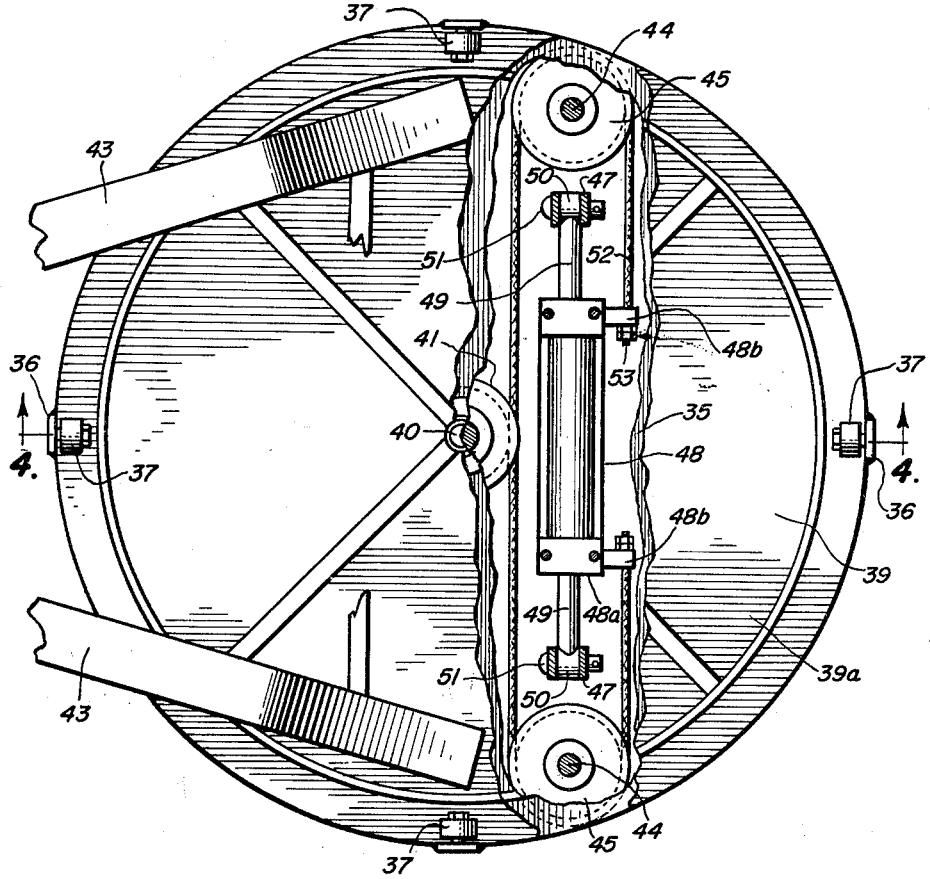
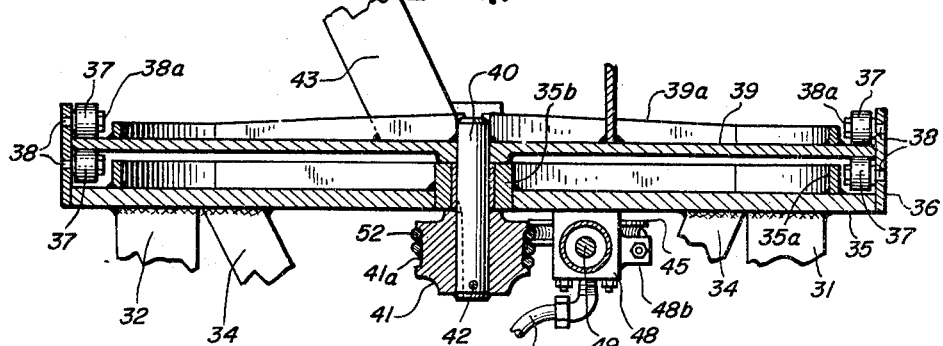
INVENTOR
Raymond C. Fischer
Paul O. Pippel
ATTORNEY 3,190,475
TRACTOR SUPPORTED IMPLEMENT MOUNTING
Raymond C. Fischer, Hinsdale, Ill., assignor to International Harvester Company, Chicago, Ill., a corporation of New Jersey
Filed Oct. 2, 1961, Ser. No. 142,151
2 Claims. (Cl. 214—132)

This invention concerns mounting means for tractor-supported implement attachments. More particularly, it concerns a mounting allowing full 360° rotation of tractor implement attachments, such as shovels or backhoes, while at the same time providing a supporting base which allows the attachment to be mounted in a high loading position.

Conventional tractor-mounted backhoes are generally limited in the amount of swing permitted the implement boom to a maximum of approximately 200°. For certain operations, such as, for example, digging parallel to the line of travel of the tractor, a greater boom swing would provide for a greater dumping area relative to the digging position and would provide versatility in loading operations. Furthermore, it often happens that booms mounted low to the ground do not provide sufficient clearance in the raised position to facilitate dumping directly into a truck. Conventional tractor-mounted units are not so adapted. They generally dump material on the ground, thus requiring a subsequent loading operation.

Accordingly, it is an object of this invention to provide mounting means for a tractor-mounted implement which will allow for full 360° swing relative to the tractor.

Another object of this invention is to provide mounting means for a tractor-mounted implement which will allow the implement to be operated high enough relative to the tractor so that direct loading may be accomplished therewith.

Still another object of this invention is to provide mounting means for a tractor-mounted implement which will provide sufficient clearances to allow larger than usual booms and buckets to be accommodated by the implement.

Yet another object of this invention is the provision of a tractor-mounted implement which may be quickly and easily attached and detached.

An additional object of this invention is the provision of a tractor-mounted implement having mounting means comprising a lower plate rigidly supported relative to the tractor and an upper boom-carrying plate rotatably mounted relative to the lower plate. Unique hydraulically operated power means are provided for facilitating rotation of the upper plate relative to the lower plate such that a complete 360° swing is available.

A further object of this invention is the provision of a tractor-mounted implement having supporting means comprising removable frame extensions with base plates pivotally mounted relative thereto. Hydraulically operated power means are provided for facilitating pivoting of the base plates from a ground-contacting position to a carrying position.

With the foregoing objects in view and such other objects and advantages as will become apparent to those skilled in the art to which this invention relates as specification proceeds, the invention consists essentially in the arrangement and construction of parts all as hereinafter and more particularly described, reference being had to the accompanying drawings in which:

FIGURE 2 is a top view essentially showing the apparatus of FIGURE 1;

FIGURE 3 is a view partially in section taken along the lines 3—3 of FIGURE 1; and FIGURE 4 is a sectional view taken along the lines 4—4 of FIGURE 3.

Figure 1:
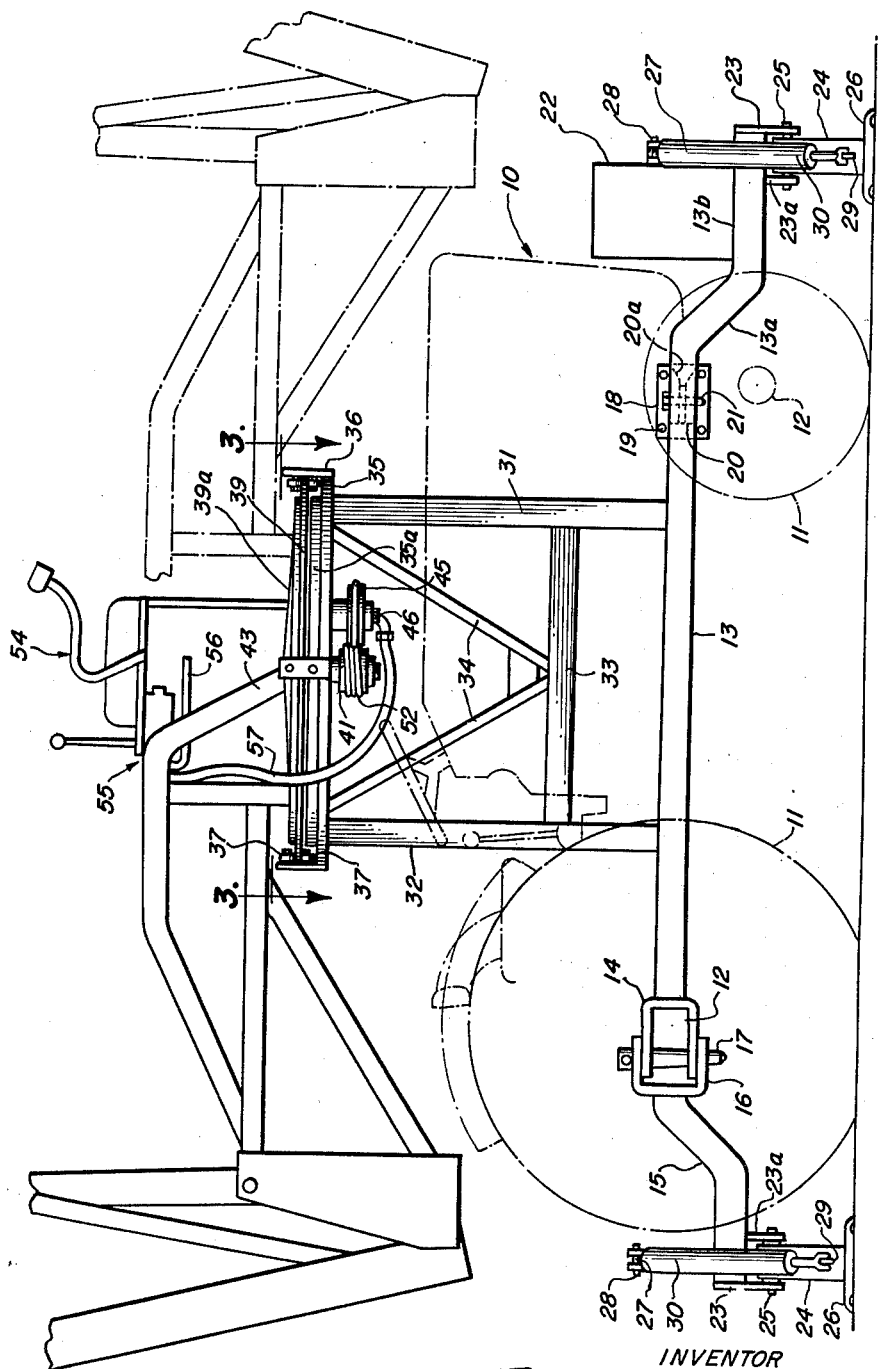
FIGURE 1 is a side-elevational view showing an implement attachment mounted on a tractor and showing the unique hydraulically operated turntable supporting the attachment along with the base plates allowing broad leverage for a high mounting.

Turning more particularly to the drawings, it will be seen that the tractor 10 is of the type having the wheels 11 mounted upon the front and rear axles 12. It should be understood, however, that the tractor need not be a four-wheel rubber-tired model, but instead may be of the crawler type. The bar 13 has at its rear end the forked yoke element 14 which fits over the rear axle 12 of the tractor 10. The rear pedestal bar 15 has the forked yoke 16 which is designed to cooperate with the yoke 14 of the bar 13. These yokes 14 and 16 are easily secured together by means of a tapered pin 17 fitting into cooperating bores in the two yokes. To the frame of the tractor 10 is secured the plate-mounting element 18 by means of the bolts 19. Protruding from the plate 18 are the lugs 20 having forwardly diverging surfaces 20a. Bar 13 has at its forward end the downwardly and forwardly extending portions 13a and 13b, respectively, which are similar in manner to the rear pedestal 15. The inwardly extending lug 13c is affixed to the forward end of bar 13 and slips within lugs 20 protruding from plate 18. These lugs are secured by means of the pin 21 easily slidable into cooperable bores therein.

At the forward and rearward pedestals are to be found similar jack assemblies. The front jack assembly mounted forwardly of the stabilizing weight box 22 comprises the downwardly extending flanges 23 and 23a to which the legs 24 are pivotally secured about the shaft 25 at one end thereof and to which the base plates 26 are secured at the other end thereof. Extending upwardly from pedestal 13b of bar 13 is a support member 27 carrying the shaft 28. An eye 29 protrudes from the area adjacent the bottom portion of leg 24. Between shaft 28 and eye 29 extends the hydraulic cylinder 30 operated by suitable lines and control apparatus (not shown). Thus base plates 26 may be raised and lowered hydraulically to provide a firm supported base for the entire implement attachment while engaged in backhoe operation.

Rigidly secured to bar 13 are the upstanding support members 31 and 32 which, in turn, are interengaged by the crossmembers 33 and 34 in order to provide a firm support assembly. Upon this assembly is mounted the lower supporting plate 35 of the 360° turntable unit.

As more clearly shown in FIGURE 4, the fixed lower support plate 35 has the reinforcements 35a to provide rigidity thereto. Extending upwardly from the ends of plate 35 is the flange member 36, which may be a single annular element or a plurality of upright elements. To member 36 are secured the shafts 38 having four pairs of upper and lower bearing rollers 37 mounted thereon by means of the nuts 38a. Upper and lower roller elements 37 serve to support the entire boom structure for the implement attachment and are designed to take thrust and torque resulting from its operation. The upper support plate 39 including the reinforcement 39a is mounted between the bearing support rollers for free rotation relative thereto and to lower plate 35. Upper plate 39 has centrally thereof a depending shaft 40 which extends through bearing surface 35b of lower plate 35 and downwardly therefrom affixed to the lower end portion of shaft 40 is the power-receiving pulley 41 by means of the pin 42 and a key (not shown). Pulley 41 has thereon the helical cable-receiving groove 41a.

Affixed to the upper plate 39 are the boom support members 43. The entire plate 39 rotates a full 360° or more in order to give maximum field flexibility to the boom and the implement. The power mechanism for causing rotation of the plate 39 is clearly shown in FIGURE 3. From lower plate 35 depend the shafts 44 upon which are rotatably secured the guide pulleys 45 as by nuts 46. It is to be understood that the pulleys 45 are freely rotatable relative to the lower plate 35. Also depending from lower plate 35 are the flanges 47. Intermediate flanges 47 is mounted the double-acting hydraulic cylinder 48 having end elements 48a and protruding eyes 48b. The piston means includes piston rods 49 extending outwardly through both end elements 48a of hydraulic cylinder 48 and having at the ends thereof eye elements 50 which, in turn, are pivotally mounted between flanges 47 by means of the pins 51, piston rods 49 thus being fixed relative to lower plate 35. It will be seen that actuation of the hydraulic power means results in the entire cylinder 48 sliding along piston rods 49. To each eye 48b is secured one end of the cable 52 by means of the nuts 53. Cable 52 extends over pulleys 45 and is wrapped two or three times around helical groove 41a of pulley 41 rigidly secured to upper plate 39.

The operator station 54 and the hydraulic control 55 are supported by the boom supports 43. From hydraulic control 55 the lines 56 and 57 communicate with respective ends of the double-acting cylinder 48. Additional lines (not shown) communicate with a hydraulic pump and reservoir in conventional manner.

In use, it will be seen that the operator, by controlling hydraulic cylinder 48, causes movement thereof relative to piston rods 49. This results in movement of cable 52 around pulley 41 imparting by means of frictional engagement a rotary motion to pulley 41 and its associated upper plate 39. The size of hydraulic cylinder 48 relative to pistons 49 and to the diameter of pulley 41 is such that a full 360° rotation of the entire upper plate and associated boom assembly may be effected in either direction so that versatility in digging and loading is assured.

It should be noted that this unit is designed for ease of assembly and disassembly. Pulling of the two tapered pins 17 allows removal of the rear stabilizer assembly. Then removal of the front pins 21 allows the tractor to be backed away from the entire attachment in a quick manner. The implement attachment may be designed so that when the boom is extended and the bucket is dropped to the ground, the frame is supported by the bucket and the front support stabilizer assembly including base plates 26. Alternately, however, another set of jacks may be provided ahead of the rear axle. With this set of jacks in the lowered position the tractor could be backed out until the front axle thereof approached these jacks. Then the front jacks could be lowered and the rear ones raised to permit backing of the tractor clear of the backhoe implement. This quick detachment feature increases the versatility of the unit by freeing the tractor for other work whenever necessary, although the tractor drawbar is usable without disassembly or dismounting of the backhoe simply by removal of the rear stabilizer unit.

Although one embodiment pertains to backhoe-type attachments for use with tractors, it is to be understood that other implements, such as shovels or diggers of other types, could also be employed without deviating from the scope of the invention.

Terms used herein, such as ground, upper, lower, horizontal, vertical, etc., are meant to be construed as relative and not in their literal sense.

Various modifications can be made in the invention hereinabove described and many apparently widely different embodiments of same made within the spirit and scope of the claims without departing from such spirit and scope. It is intended that all matter contained in this specification shall be interpreted as illustrative only and not in a limiting sense.

I claim:

1. In an implement adapted to be mounted on a tractor, frame means adapted to be fixedly secured to the tractor and including an upstanding support portion extending therefrom, first circular plate means mounted on said support portion and having bearing means centrally thereof and peripheral flange portion means extending therefrom, said flange portion means including a plurality of pairs of vertically spaced shafts extending inwardly therefrom, each of said shafts having a bearing roller mounted thereon, second circular plate means mounted between said rollers, said second plate means having a central shaft extending therefrom through said bearing means, a power-receiving pulley having a helical cable-receiving groove therein mounted on said central shaft, double-acting hydraulic power means including a cylinder and piston means having a pair of piston rods extending axially therefrom, each of said piston rods being connected to said first plate means whereby actuation of said power means causes said cylinder to slide relative to said piston rods, a pair of guide pulleys mounted on said first plate means, cable means having ends fixed to respective ends of said cylinder and extending about said guide pulleys and said power-receiving pulley whereby sliding movement of said cylinder causes said cable means to drive said power-receiving pulley thereby rotating said second plate means at least one complete revolution, and means for actuating said power means.

2. The invention according to claim 1, said pairs of vertically spaced shafts being four in number and being equally spaced around the periphery of said first plate means.

References Cited by the Examiner

UNITED STATES PATENTS

| | | | |
|---|---|---|---|
| 1,721,335 | 7/29 | Paris | 248—349 |
| 1,732,113 | 10/29 | Van Der Meer | 248—349 |
| 1,854,850 | 4/32 | Linkenauger. | |
| 2,098,237 | 11/37 | Haily | 212—68 |
| 2,404,459 | 7/46 | Roeder et al. | 308—203 X |
| 2,478,747 | 8/49 | Deal et al. | 214—132 |
| 2,559,733 | 7/51 | Pitman et al. | 212—67 |
| 2,826,923 | 3/58 | Sibley | 74—95 |
| 2,827,183 | 3/58 | Wagner et al. | 214—132 |
| 2,951,460 | 9/60 | Pierson | 74—95 |
| 2,992,016 | 7/61 | Pilch | 214—132 |
| 3,003,649 | 10/61 | Przybylski | 212—69 |
| 3,033,380 | 5/62 | Dorkins | 214—132 X |
| 3,034,670 | 5/62 | Lafian | 212—68 X |

HUGO O. SCHULZ, *Primary Examiner.*

ERNEST A. FALLER, Jr., *Examiner.*